United States Patent [19]

Stasio

[11] 3,738,316

[45] June 12, 1973

[54] BRINE SHRIMP HATCHERY

[75] Inventor: Robert Stasio, Brooklyn, N.Y.

[73] Assignee: Metaframe Corporation, Maywood, N.J.

[22] Filed: Nov. 22, 1971

[21] Appl. No.: 200,954

Related U.S. Application Data

[63] Continuation-in-part of Ser. No. 52,804, July 7, 1970, Pat. No. 3,669,074.

[52] U.S. Cl. .................................................. 119/2
[51] Int. Cl. ............................................. A01k 61/00
[58] Field of Search ...................... 119/2, 3; 43/55, 43/56

[56] References Cited
UNITED STATES PATENTS

| | | | |
|---|---|---|---|
| 2,920,606 | 1/1960 | Anderson | 119/2 |
| 3,086,497 | 4/1963 | Novello | 119/2 |
| 3,413,957 | 12/1968 | Steiner | 119/3 |
| 3,540,414 | 11/1970 | Maloney, Jr. | 119/2 |
| 3,669,074 | 6/1972 | Stasio | 119/2 |

*Primary Examiner*—Louis G. Mancene
*Assistant Examiner*—James H. Czerwonky
*Attorney*—Abraham Friedman and Abraham Goodman

[57] ABSTRACT

A brine shrimp hatchery comprising a first receptacle for confining brine shrimp egg-laden fluid, and a second receptacle operatively associated with the first receptacle and partially submerged in the latter for entrapping brine shrimp hatched in the first receptacle. The second receptacle is inverted and includes a chamber, defined by its upper closed end, for resisting gravitational outflow of fluid confined therein through a lower open end which is submerged in the fluid provided in the first receptacle, thus, permitting hatched brine shrimp to pass into the inverted second receptacle from the first receptacle.

10 Claims, 3 Drawing Figures

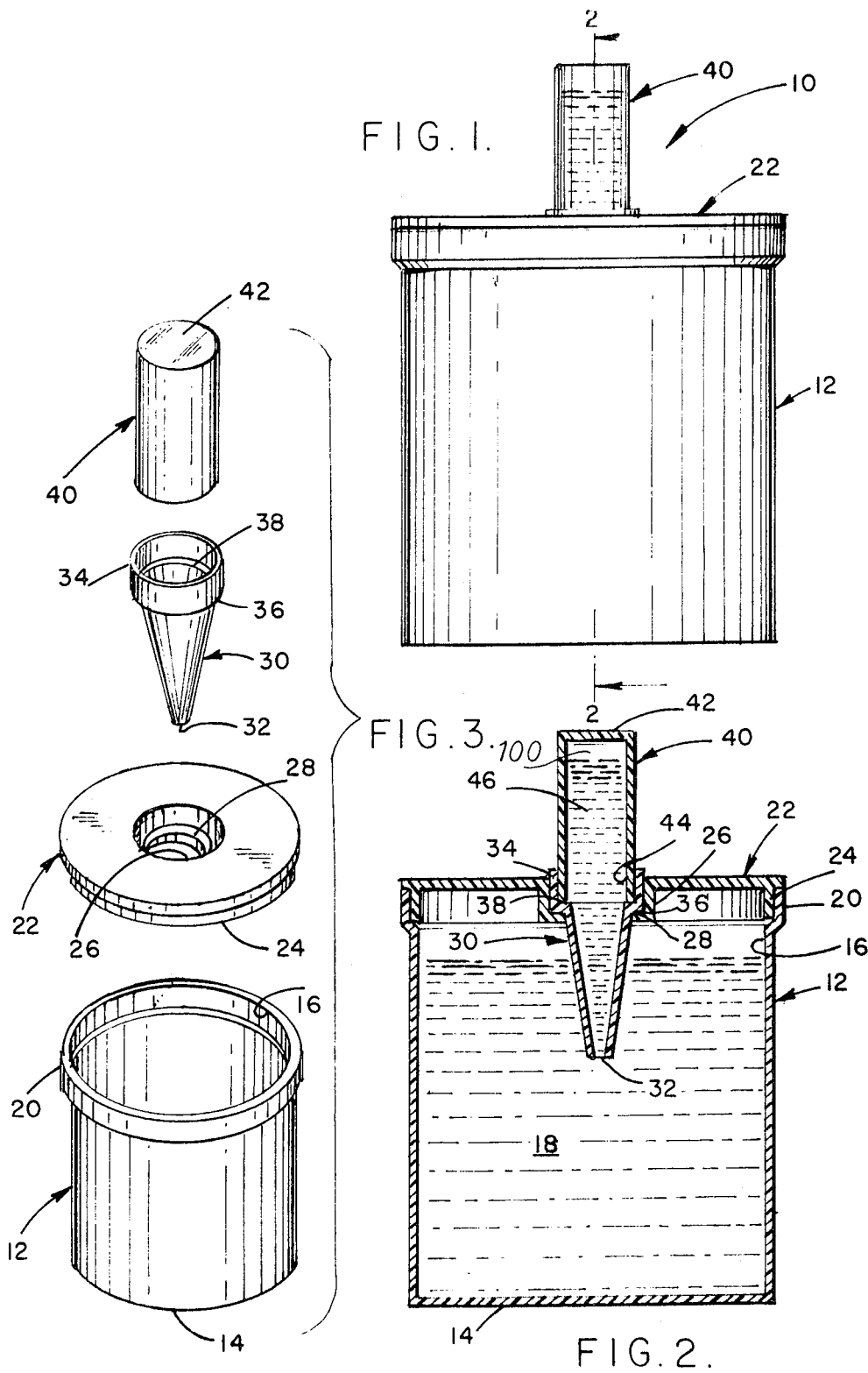

BRINE SHRIMP HATCHERY

CROSS-REFERENCE TO RELATED APPLICATION

This is a continuation-in-part of my co-pending U.S. Pat. Application, Ser. No. 52,804, filed on July 7, 1970, now U.S. Pat. No. 3,669,074, issued June 13, 19722.

BACKGROUND OF THE INVENTION

The present invention relates generally to a brine shrimp hatchery, and more particularly to a hatchery having two receptacles, each of which receptacles is provided with water. One of the receptacles is inverted, has an open end portion which is submerged in the other and can be readily removed to be transported to a secondary location. The receptacle in which the other is partially submerged is provided with brine shrimp eggs which when hatched will permit the shrimp to swim into the other through the submerged open end for entrappment so that, thereafter, the entrapped shrimp may be utilized for feeding fish.

The present invention also relates generally to a brine shrimp hatchery for maintaining both fresh water and salt-water in partial contacting, yet isolated, relation such that brine shrimp hatched from eggs in the salt-water need not be washed thereafter for the purpose of removing the salt content thereof.

Generally speaking, as those skilled in the art understand, it is a desirable expedient to cleanse brine shrimp hatched in salt-water from the salt content thereof. Heretofore, the cleansing operation was done as an additional step after the brine shrimp have hatched in the salt-water, this additional step usually being time-consuming and generally cumbersome because of the relatively complicated relationship of the hatchery structure with that of the structure in which the brine shrimp are thereafter cleansed.

Attempts have been made, heretofore, at providing structure for maintaining fresh or salt-free water in communicating relation with a salt-water-confining vessel in which the brine shrimp eggs are predisposed. This principal permits the hatched brine shrimp to pass into the fresh or salt-free water zone from the salt-water-confining vessel, thereby, resulting in a direct washing or cleansing of the brine shrimp of the salt content thereof. However, the relationship of prior art structure for effecting this principal is somewhat complex because of the manner by which the structure must be manually operated and controlled prior to, during and after hatching of the brine shrimp.

SUMMARY OF THE INVENTION

Accordingly, it is an object of the present invention to provide an improved and novel brine shrimp hatchery having a first receptacle in which brine shrimp eggs may be hatched, and a second receptacle detachable from the first and into which hatched brine shrimp may pass for entrappment.

It is another object of the present invention to provide a brine shrimp hatchery in which fresh or salt-free water is maintained in partially contacting, yet isolated relation with salt-water in which brine shrimp eggs are predisposed.

It is still another object of the present invention to provide a brine shrimp hatchery having structure that once assembled will obviate the need for further manipulation and will self-entrap hatched brine shrimp effectively and reliably.

It is another object of the present invention to provide a brine shrimp hatchery having structure that may be quickly assembled for entrapping hatched brine shrimp and, thereafter, quickly disassembled for permitting removing of the hatched brine shrimp therefrom.

It is still a further object of the present invention to provide a brine shrimp hatchery having a fresh or salt-free water zone, wherein brine shrimp may be entrapped, and a salt-water zone, wherein brine shrimp eggs are predisposed for hatching, each contacting one another and separable from one another without any necessity for manually closing one zone relative to the other, the fresh water zone being transparent for permitting observation of the number of brine shrimp entrapped therein.

To this end, the present invention relates generally to a brine shrimp hatchery comprising a first receptacle for confining brine shrimp egg-laden fluid, and a second receptacle operatively associated with the first receptacle and partially submerged in the latter for entrapping brine shrimp hatched in the first receptacle. The second receptacle is inverted and includes a chamber for resisting gravitational outflow of fluid confined therein through a lower open end which is submerged in the fluid provided in the first receptacle, thus, permitting hatched brine shrimp to pass into the inverted second receptacle from the first receptacle.

BRIEF DESCRIPTION OF THE DRAWINGS

With the above and additional objects and advantages in view as will hereinafter appear, this invention comprises the devices, combinations and arrangements of parts hereinafter described and illustrated in the accompanying drawings of a preferred embodiment in which:

FIG. 1 illustrates a front elevational view of the brine shrimp hatchery pursuant to the present invention;

FIG. 2 illustrates a cross-sectional elevational view taken along the line 2—2 in FIG. 1; and FIG. 3 illustrates an exploded perspective view of the structure comprising the brine shrimp hatchery pursuant to the present invention.

DETAILED DESCRIPTION OF THE INVENTION

Referring now to the drawings, the present invention relates generally to a brine shrimp hatchery denoted by the reference character 10. The hatchery 10 is generally constituted of materials such as plastic or other suitable non-corrosive substance and includes preferably an opaque receptacle 12 for confining salt-water. The receptacle 12 includes a closed bottom end 14 and an open upper end 16, thereby, permitting a predisposition of salt or sea-water 18 therein. The open upper end 16 of the receptacle 12 includes an annular ledge portion 20.

Operatively associated in close-fitting relation with the open upper end 16 of the receptacle 12 is an opaque top cover member 22 having an outer peripheral annular wall 24 extending transversely thereto and insertable into the open upper end 16 of the receptacle 12 into close-fitting relation with the latter. The top cover member 22 is provided with a generally centrally disposed apertured portion 26 which terminates in an annular ledge 28 as illustrated generally in FIGS. 2 and 3.

Operatively associated in close-fit relation with the top cover member 22 is a generally frusto-conical conduit 30 which tapers to a minimum size lowermost open end 32 which is submergible in the sea-water 18 predisposed in the receptacle 12. Furthermore, the frusto-conical conduit 30 is preferably opaque and provided with an uppermost enlarged open end 34 having an outer annular shoulder 36 for resting upon the annular ledge 28 of the top cover member 22. Provided internally of the enlarged open end 34 of the frusto-conical conduit 30 is an inner annular ledge 38, the purpose of which will be clarified below.

Operatively associated with the opaque frusto-conical conduit 30 in press-fit relation is a transparent or translucent chamber 40 of generally cylindrical extent and having a closed upper end 42 and an open lower end 44, the latter which is insertable into press-fit relation into the enlarged open end 34 of the frusto-conical conduit 30 for resting upon the annular ledge 38 of the conduit 30.

In operation, the brine shrimp hatchery 10, pursuant to the present invention, requires a predisposition of salt-water 18 into the opaque receptacle 12 and, thereafter, a predisposition of brine shrimp eggs in the salt-water 18. The salt-water should generally be maintained at a temperature between 75°–80° F and maintained at this temperature for approximately 24 hours or for so long as it is necessary for the brine shrimp eggs to hatch.

The opaque top cover member 22 is then fit onto the opaque receptacle 12 so as to rest freely thereon and act as a coupling means for receiving the frusto-conical conduit 30.

In this respect, prior to connecting the frusto-conical conduit 30 to the top cover member 22, the chamber 40 is filled with fresh or salt-free water and the frusto-conical conduit 30 is connected to the chamber 40. The chamber 40 and frusto-conical conduit 30 are interconnected in generally press-fit, yet air sealing relation and, thus, when filled with the fresh water 46, and inverted such that the minimum sized open end 32 of the frusto-conical conduit 30 extends vertically below the closed upper end 42 of the chamber 40, there may be a partial loss of the fresh water 46 through the minimum sized open end 32 of the frusto-conical conduit 30 and the formation of what may be characterized a partial vacuum at the closed upper end 42 of chamber 40 and denoted by the reference character 100. Yet, because of the stationary relationship of the size of the open end 32 with that of the overall elongate extent of the combined frusto-conical conduit 30 and chamber 40, and the closed end 42 of the latter, there will be prevented a continued gravitational outflow of the fresh water 46 through the minimum sized open end 32 of the frusto-conical conduit 30.

Therefore, the interconnected chamber 40 and the frusto-conduit 30, as filled with the fresh water 46, may be inverted and inserted through the centrally disposed apertured portion 26 in the top cover member 22. Thereafter, the frusto-conical conduit 30 may be fitted downwardly such that the outer annular shoulder 36 thereof will engage and rest upon the annular ledge 28 of the centrally disposed apertured portion 26 in the top cover member 22. Thus, although the fresh water 46 now directly contacts the sea-water 18 at the minimum sized open end 32 of the frusto-conical conduit 30, the fresh water 46 is maintained in isolated relation with the sea-water 18, notwithstanding the inverted relationship of the interconnected frusto-conical conduit 30 and chamber 40. This isolation is enhanced by the fact that salt-water has a greater density than fresh water.

Upon hatching of the brine shrimp eggs, the hatched brine shrimp will be attracted to light and therefore swim into the frusto-conical conduit 30 through the minimum sized open end 32 thereof and be entrapped therein for eventual removal therefrom. In order to enhance the reliability of the hatched brine shrimp to swim from the receptacle 12, wherein they are hatched, into the frusto-conical conduit 30, the receptacle 12 and the top cover member 22 are preferably constituted of opaque material, as discussed above, whereas only the chamber 40 is preferably constituted of transparent material so as to permit a localized lighted zone for attracting the hatched brine shrimp into the frusto-conical conduit 30 for entrappment and cleansing. Moreover, the formation of the partial vacuum will result in a somewhat greater amount of oxygen for the shrimp and will permit the latter to remain in chamber 40 for an increased period of time. The partial vacuum also may cause a greater reflection of light internally of the chamber 40 and increase its attraction to the shrimp as the latter are hatched.

Clearly, as those skilled in the art will readily understand, because of the isolation of the fresh water 46 relative to the sea-water 18, as the hatched brine shrimp swim into the frusto-conical conduit 30, the shrimp will be cleansed of the salt content thereof by the fresh water 46.

After the hatching process, the interconnected frusto-conical conduit 30 and chamber 40 may be together removed from the top cover member 22, this because of the relationship of the frusto-conical conduit 30 with that of the top cover member 22, and the fresh water 46 together with the entrapped hatched brine shrimp may be carried to any other desirable location, notwithstanding the inverted extent of the frusto-conical conduit 30 such that its minimum sized open end 32 remains in a condition under the closed upper end 42 of the chamber 40.

As is evident to those skilled in the art, the brine shrimp hatchery 10, pursuant to the present invention, may be quickly assembled because of the close-fit realtionship of each of its components and, thereafter, disassembled so as to permit further handling of entrapped hatched brine shrimp as cleansed in the fresh water 46 provided in the interconnected frusto-conical conduit 30 and chamber 40. Moreover, it is likewise clear that once the brine shrimp hatchery 10 is fully assembled in a manner as illustrated in FIGS. 1 and 2, absolutely no further manipulation of the structure thereof is necessary for maintaining the entrapped brine shrimp in the frusto-conical conduit 30 since fluid is prevented from flowing out of the latter automatically. Thus, the dismantling of the hatchery 10, pursuant to the present invention, is effected simply and quickly without any regard to further manipulation such as that which is necessary in the prior art for closing the minimum sized open end 32 of the frusto-conical conduit 30.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A brine shrimp hatchery comprising a first receptacle for confining brine shrimp egg-laden fluid, said first receptacle having an open upper end, and a second receptacle for confining fluid therein, said second receptacle having an upper closed end and a lower open end, said lower open end of said second receptacle detachably extending through said upper open end of said first receptacle for being submerged in the fluid of the latter, said upper closed end of said second receptacle acting to resist gravitational outflow of fluid in the latter through said lower open end and supporting means for detachably interconnecting said first and second receptacles to one another.

2. A brine shrimp hatchery as claimed in claim 1, wherein said second receptacle includes a conduit having opposite open ends, one of said open ends being detachably associated with said supporting means, the other of said open ends being associated with the interior of said first receptacle.

3. A brine shrimp hatchery as claimed in claim 2, wherein said second receptacle includes means for defining a chamber having one open end detachably associated with the open end of said conduit which is detachably associated with said supporting means.

4. A brine shrimp hatchery as claimed in claim 3, wherein said chamber, said conduit and said supporting means are detachably associated with one another in close-fit relation.

5. A brine shrimp hatchery as claimed in claim 1, wherein said second receptacle includes a tapered frusto-conical portion terminating in an open end submerged in the fluid confined in said first receptacle.

6. A brine shrimp hatchery as claimed in claim 1, wherein said supporting means includes a cover member having an outer periphery operatively associated with said first receptacle means in close-fit free-resting detachable relation.

7. A brine shrimp hatchery as claimed in claim 6, wherein said supporting means is provided with a generally centrally disposed aperture through which said second receptacle extends at least in part in close-fit relation.

8. A brine shrimp hatchery as claimed in claim 7, wherein said aperture in said supporting means includes an annular ledge upon which rests said second receptacle.

9. A brine shrimp hatchery as claimed in claim 8, wherein said second receptacle includes two portions detachably associated with one another, one of said portions including an outer annular shoulder for resting on said annular ledge of said supporting means and an inner annular ledge upon which rests the other of said portions.

10. A brine shrimp hatchery as claimed in claim 3, wherein said chamber is transparent and said conduit is opaque.

* * * * *